US006694286B2

(12) United States Patent
Ottosson

(10) Patent No.: US 6,694,286 B2
(45) Date of Patent: Feb. 17, 2004

(54) METHOD AND SYSTEM FOR MONITORING THE CONDITION OF AN INDIVIDUAL MACHINE

(75) Inventor: Torbjörn Ottosson, Västerås (SE)

(73) Assignee: ABB AB, Västerås (SE)

( * ) Notice: Subject to any disclaimer, the term of this patent is extended or adjusted under 35 U.S.C. 154(b) by 324 days.

(21) Appl. No.: 09/751,153

(22) Filed: Dec. 27, 2000

(65) Prior Publication Data
US 2001/0005821 A1 Jun. 28, 2001

(30) Foreign Application Priority Data
Dec. 23, 1999 (EP) .......................................... 99125818

(51) Int. Cl.$^7$ ................................................ G06F 11/30
(52) U.S. Cl. .......................................... 702/182; 700/29
(58) Field of Search ............................... 702/181, 182, 702/183, 185, 188, 193, 117, 118, 104, 81, 64, 65, 66, 35, 34, 36; 700/1, 9, 10, 17, 21, 28, 29, 30, 31, 32–34, 40, 67, 79, 80, 275, 286; 703/3, 4, 17, 21, 22; 324/379, 512, 537, 750, 76.77, 76.82

(56) References Cited

U.S. PATENT DOCUMENTS

| | | | | | |
|---|---|---|---|---|---|
| 4,536,849 A | * | 8/1985 | Borisch et al. | ............. | 324/73.1 |
| 5,442,562 A | * | 8/1995 | Hopkins et al. | ............. | 700/108 |
| 5,602,761 A | * | 2/1997 | Spoerre et al. | ............. | 702/179 |
| 5,710,723 A | * | 1/1998 | Hoth et al. | ................. | 702/181 |
| 5,852,351 A | * | 12/1998 | Canada et al. | .............. | 318/490 |
| 5,852,793 A | * | 12/1998 | Board et al. | ................. | 702/183 |
| 5,864,773 A | * | 1/1999 | Barna et al. | ................. | 702/182 |
| 6,078,874 A | * | 6/2000 | Piety et al. | .................. | 702/122 |
| 6,138,078 A | * | 10/2000 | Canada et al. | .............. | 318/490 |
| 6,157,677 A | * | 12/2000 | Martens et al. | .......... | 348/416.1 |
| 6,208,266 B1 | * | 3/2001 | Lyons et al. | ............ | 340/870.01 |
| 6,262,550 B1 | * | 7/2001 | Kliman et al. | .............. | 318/565 |
| 6,280,380 B1 | * | 8/2001 | Bardy | ......................... | 600/300 |
| 6,330,525 B1 | * | 12/2001 | Hays et al. | .................. | 376/245 |

FOREIGN PATENT DOCUMENTS

WO    WO 98/39718    9/1998

\* cited by examiner

Primary Examiner—Marc S. Hoff
Assistant Examiner—Edward Raymond
(74) Attorney, Agent, or Firm—Jenkens & Gilchrist

(57) ABSTRACT

A method for monitoring the condition of an individual machine belonging to a selected class of machines, wherein operational data significant for that condition are compared with a reference data according to a predetermined criterion, and wherein an output signal indicating the result of the comparison is formed, the method comprising the steps of:

creating a first set of operational data for the selected class of machines on the basis of data stored in a reference database, creating a second set of operational data for the individual machine based on measurements performed on that machine, forming a first reference data in dependence on values of at least a selection of said first set of operational data, forming a second reference data in dependence on values of said second set of operational data, comparing said second reference data with said first reference data in accordance with the first predetermined criterion, and forming the output signal in dependence on the result of said comparison.

27 Claims, 4 Drawing Sheets

Fig. 1

| Nr | Name |
|---|---|
| 1 | Cold cooling water |
| 2 | Cold air 1 |
| 3 | Cold air 2 |
| 4 | Hot air 1 |
| 5 | Hot air 2 |
| 6 | Hot cooling water |
| 7 | Stator winding L2 |
| 8 | Stator winding L3 |
| 9 | Stator winding L1 |
| 10 | Stator winding L3 |
| 11 | Stator winding L1 |
| 12 | Stator winding L2 |
| 13 | Bearing housing 1 |
| 14 | Bearing housing 2 |
| 15 | Bearing housing 4 |
| 16 | Bearing housing oil 1 |
| 17 | Lwr ctrl wd segment 1 |
| 18 | Lwr ctrl wd segment 3 |
| 19 | Upp ctrl wd segment 1 |
| 20 | Upp ctrl wd segment 3 |
| 21 | Turb bearing segmnt 1 |
| 22 | Turb bearing segmnt 3 |
| 23 | Seal housing |
| 24 | Stator winding L1 |
| 25 | Stator winding L2 |
| 26 | Stator winding L3 |
| 27 | Bearing housing 3 |
| 28 | Bearing housing 5 |
| 29 | Lwr ctrl wd segment 2 |
| 30 | Lwr ctrl wd segment 4 |

| Nr | Name |
|---|---|
| 31 | Upp ctrl wd segment 2 |
| 32 | Upp ctrl wd segment 4 |
| 33 | Turb bearing segmnt |
| 34 | Seal housing |
| 35 | Flow |
| 36 | Height of water drop |
| 37 | LVY |
| 38 | UVY |
| 39 | Flow station |
| 40 | Flow gate 1 |
| 41 | Flow gate 2 |
| 42 | Actual value MW |
| 43 | Actual value Mvar |
| 44 | Actual value voltage |
| 45 | Meas val A130 bus voltag |
| 46 | Meas val T8 current |
| 47 | Meas val T8 MW |
| 48 | Meas val T8 MVAr |
| 49 | Meas val bus A voltage |
| 50 | Not implemented |
| 51 | Breaker to generator |
| 52 | Pump to bearing housing |
| 53 | To brakes |
| 54 | To field breaker |
| 55 | To turbine ctrl winding |
| 56 | To oil pressure pump 1 |
| 57 | To oil pressure pump 2 |
| 58 | D/S valve drive |
| 59 | To breaker of T8-130-S |
| 60 | To isolator of T8-A130-F |

METHOD AND SYSTEM FOR MONITORING THE CONDITION OF AN INDIVIDUAL MACHINE

TECHNICAL FIELD

The present invention relates to a method and a system for monitoring the condition of an individual machine belonging to a selected class of machines, as defined by the preamble of independent patent claim 1, as well as to a system for executing the method.

The industrial economy is a complex system of people, objects, machines, and processes interacting with each other, to create, produce, distribute and consume products. All elements of this system are expected to work according to certain values, to keep it alive. As regards the technical side of the system, the status of processes and machines has to be monitored, to be able to decide whether they can deliver the output they have been designed for. Status monitoring in general comprises a repeated or continued consideration of critical values like temperature, pressure, speed, etc. that are known to have a major influence on process or machine behaviour, or that are known to indicate a malfunction.

Status monitoring of machines, such as electrical machines, is known to be done by comparing data that has been gathered by means of sensors or equivalent measures, for the same machine at different points in time. The problem with doing so, notwithstanding the fact that valuable data can be gathered for this single machine, is that it takes a lot of time to build a data pool for the machine to be monitored, so that certain behaviours, and trends as regards the status of this machine can only be predicted on the basis of such data, after the machine has been running for a long time. Similar monitoring has also been carried out for industrial processes. This is not only ineffective but also costly, and thus economically disadvantageous.

BACKGROUND ART

Several methods and devices for monitoring the status of a machine are known from the state of the art.

Document U.S. Pat. No. 5,251,151 discloses a method and apparatus for diagnosing the mechanical condition of a machine. The method includes the steps of sensing a reference vibration signal of the machine; creating a reference set of events from the reference vibrational signal of the machine; saving the reference set of events; sensing a test vibrational signal of the machine; creating a test set of events from the test vibrational signal of the machine; and, comparing the test set of events with the reference set of events to determine the mechanical condition of the machine.

Furthermore, document WO 97/20224 discloses a process and a device for testing a plurality of electric devices, whereby measurement values are simultaneously collected for the plurality of electric devices and the signals that describe said values are provided with device specific identification-codes. The thus identified signals are then uninterruptedly supplied on-line to a data processing system where they are compared to nominal values. When a signal deviates from a nominal value, the device from which the signal originated is indicated as defective.

Finally, document EP 0 775 335 B1 discloses a method for monitoring multivariate processes, in which the course of the process is dependent on a multiple of variables relevant to the process. The method involves a description of the relevant variables as a multidimensional room, wherein each variable represents an independent component in the room, that the observations of the variable values at a certain time represent a point in the multidimensional room, that the observations from a number of times form a point swarm in the room, that at least one first and one second principal direction of the point swarm are calculated, that the projections of the observations on these first and second principal directions are determined, that the observations are illustrated graphically in the plane which is formed by the first and second principal directions in the point swarm, further that the principal directions are continuously up-dated during the course of the process, whereby the graphic information becomes dynamic, and, finally, that the operator or the monitoring member of the process, based on the presented information, adapts members which influence variable quantities in the process such that the process is controlled to optimum operating conditions. Information about the course of the process is obtained by projecting measured data onto a plane which is comprised in the variable space which describes the process. The plane to which measured data are projected, according to the PCA and PLS methods, dynamically follows the flow of new series of measured process data, the projection plane being able to rotate in the multivariate room which describes the process. This provides a constant monitoring of the process in relation to the present stage and not in relation to a process historical stage.

However, although the above mentioned methods provide a number of advantageous features, a substantial problem remains, namely a shortage of reference data when a new machine, method, or process is developed. More specifically, there is a shortage of data on faults, and problems with new machines/processes, etc.

Thus the object of the present invention is, to provide a method and a system for monitoring the condition of an individual machine of a certain type, which method and system provides status data for comparison quickly and reliably, makes reference data rapidly available to a new machine/process, so that faults or problems with a new machine or process can be rapidly detected.

This object is solved by the features of independent patent claim 1, whereby advantageous embodiments of the invention are described by the features as contained in the dependent claims.

SUMMARY OF THE INVENTION

The basic idea of the present invention is that instead of gathering a data pool for a single object, e.g. one machine only, that object or machine is compared with similar machines by means of a common, possibly global data bank, obtaining a much greater statistical basis, resuiting in many more possibilities to anticipate needs or demands for corrective measures, as regards the monitored machine. By comparing data for a machine with data from many others of the same type, with help of a global data bank and an analysis function, one can determine the absolute and actual condition for the machine and in such a way more quickly capture a deterioration. Thus, a method for the determination of the absolute/actual status for a machine, electrical or not, via a global data bank is provided. This is carried out by comparing data from individual machines with a compilation of data from many other machines. The benefit is more certain information, determinations, much earlier detection of change or deterioration for a newly developed machine or process, of operating condition and through that better maintenance planning and thereby lower costs for customers.

There are different types of data that may be used to compare an object, a machine, or aggregate, with all other objects, or machines of the same type. One way is to compare the rate of change of e.g. a bearing temperature with the mean values of the rate of change for all other machines, as contained in the data base. Another way could be to compare the machine data measured at specified loads, e.g. 100%, with the other machines as contained in the data base at 100% load. Although every machine is individual, the mean value of many machines should be essentially constant, while the individual machine can vary. For example, electrical generators of the Powerformer™ type may be considered as a specific type of machine or as a selected class of machines. Even somewhat different machines may have certain selections of parameters that behave in a common way. For example, Powerformer™ generators of a broadly similar output for both hydro-generation and for turbo-generation may together form a selected class of machines, especially in respect of a selection of parameters of interest considered to act in a common or similar way.

The method according to the present invention for monitoring the condition of an individual machine belonging to a selected class of machines, wherein operational data significant for that condition is compared with a reference data according to a predetermined criterion, as contained in a reference data base, to which other objects of the same selected class as the individual object may be connected, and which central data base contains a compilation of the operational data of all machines connected to the data base, such as data models that have been created under consideration of the type of objects connected to the data base, the age of objects, etc., other influences such as renovations, known faults etc. as well as transducer data from the individual object, and wherein an output signal indicating the result of the comparison is formed, comprises the steps of creating a first set of operational data for the selected class of machines on the basis of data stored in a reference database, creating a second set of operational data for the individual machine based on measurements performed on that machine, forming a first reference data in dependence on values of at least a selection of said first set of operational data, forming a second reference data in dependence on values of said second set of operational data, comparing said second reference data with said first reference data in accordance with the first predetermined criterion, and forming the output signal in dependence on the result of said comparison.

After connecting to the central data base, transducer data of the individual machine may be transferred to the central data base, to be stored in an individual database, located at the reference database, and model data that has been created by means of analysis tools at the central data base may be transferred to a storage at the individual object, i.e. the individual machine, for comparison with transducer data of the individual object during pre-processing.

According to an advantageous embodiment of the invention, the method comprises the steps of performing a non-fault check on said second set of operational data before said step of up-loading and storing said second set of operational data in said reference database.

Preferably, the reference data or model as provided by the central data base will not be altered under consideration of the data as obtained by means of the transducer in the individual machine, before actions on the object itself, e.g. service measures or component exchanges, have been carried out, so that the model still represents the state of the object in the pre-altered situation.

According to another advantageous embodiment of the present invention said step of forming a first reference data comprises the step of selecting in said reference database operational data for a selected group of parameters and forming said first reference data in dependence on operational data for said selected group of parameters, and that said step of forming a second reference data comprises the step of selecting in said second set of operational data operational data for said selected group of parameters.

According to another embodiment of the present invention, for comparing the operational data of the individual machine with the compilation of data in the data base, a statistical analysis according to a predetermined statistical method of the operational data stored in said reference database can be used, either for creating reports locally at the individual object following a comparison of data or centrally at the central data base, for creating the first reference data in dependence on the result of said statistical analysis.

The criteria for comparing "operational data" that has been provided by the transducer and has been pre-processed, with "reference data" as contained in a model is that the value in question lies outside normal values in that point of operation, i.e. that a normalised value (the residual) has exceeded a fixed boundary value, whereby boundary values can be set for alarming as well as for critical circumstances.

Furthermore, the reference database may contain a time series of values for one or more parameters of the operational data for every individual machine that can be connected to the reference database.

According to the method as proposed by the present application, the second reference data may either be formed at the local machine, or may be formed centrally in a system including the reference database. Equally, the first reference data may be formed from a copy of the individual database, located at the local machine, so that the first reference data may be compared with the second reference data at the local machine, or the first reference data may be compared with the second reference data centrally in a system including the reference database, whereby the second reference data may obtained from the individual database, located at the system, including the reference database.

Two or more first reference data may each be formed in dependence on the operational data collected from the selected class of machines, and two or more second reference data may each be formed in dependence on the operational data collected from the individual machine.

According to a further advantageous embodiment of the present invention, the statistical analysis can be a multivariate analysis. Basically, every single machine, for example power generators and the like, is an individual with its own pre-conditions. However, through statistical correlation of data from a number of generators in a model, deviations/divergences from normal behaviour can be detected for individual generators. For the statistical treatment of the collected data, a multivariate analysis (MVA) is an appropriate tool. By sampling a variable, namely through a sensor or equivalent means, for example at a time when each of the machines, generators, etc. are at maximum power, even the data from several generators can be correlated with exactly the same method. Multivariate alarms are very informative, since they are based on all the operational variables. It is not uncommon for a disturbance to start with small deviations in several operational variables at the same time. Such small drifts are normally difficult to detect. As regards the presentation of a multivariate value, the latter (normalised residual) can for example be presented in an xy plot and can give indications of which measured values has given rise to a possible deviation from the model (greater residual). Thus, up to 60 trend curves or even more can be reviewed as a "snake plot" in two dimensions. Statistical treatment with MVA is used to produce reference data in the form of a graph or picture such as a point swarm or snake plot which may additionally be displayed on a computer monitor.

What can be shown by a "multivariate alarm" and how such an alarm can be put to use depends on what type of criteria is established for the comparison of "operational data" with "reference data". A multivariate alarm may be established which, depending upon a choice of criteria shall indicate states such as Alarm and Critical. Suitably selected Critical or even Stop indicators may provide protective measures. Such a protective measurement is very demanding as regards accuracy, and is suitable for clearly defined signal levels.

There are two different techniques for modelling processes. Mechanistic modelling, which is also known as hard modelling, and empirical, or soft modelling. Hard/ mechanistic models are commonly used, for example, in physics. They are formulated from axioms or fundamental theories. Real data are 'only' used to verify or discard the model. A good mechanistic model has the advantage of being based on established theories and is usually reliable over a wide range. However, while mechanistic modelling is a feasible approach for relatively small systems, it is difficult and sometimes even impossible, to build an axiom around a complex industrial process.

Quite contrary, in empirical modelling the model is based on real data. The technique obviously relies on this data being of very high quality. Process data consist of many different measured values, which makes them multivariate.

Different statistical methods exist for multivariate modelling. However, traditional multivariate modelling techniques, such as multiple linear regression (MLR), assume error-free, independent data. Such techniques therefore will not work for the present invention, since they are highly correlated and sometimes also quite sensitive to noise.

A solution to this problem is to use projection techniques. These are capable of extracting the systematic part of the data and of expressing this information as latent variables. Projection techniques are ideal for fast overviews of a complex process, and therefore very well suited for the present case. Two techniques which are tailor-made for process monitoring, identification of relationships between process parameters and quality-related parameters, etc, are the projection techniques Principal Component Analysis (PCA) and Projection to Latent Structures (PLS), which may be used for the statistical analysis in the method of the present invention.

The models built using these two methods can be executed on-line in the operational data information system environment and then used to provide a or several reference data for status monitoring purposes.

The basic idea behind PCA is to construct a "projection window" which provides the reference data as the optimum picture of the multidimensional data. Thus, PCA ensures the best possible window, giving an optimum picture of the data. What is more, the window can be saved and displayed graphically. PCA of process or operational data typically involves finding a very strong first component, a less important second component, and a third component describing a small but still systematic structure in the data. The PCA method is appropriate for analysing a block of Process or operational data. Typical areas that can be analysed using PCA are data overview, classification, when the process is under or out of control, and real-time monitoring, to track the process conditions and detect an approaching event or deviation as early as possible.

PLS is a projection technique with which complex process relationships can be modelled. It decomposes two blocks of data, X and Y, into principal component-like projections. In PLS the projections are constructed to obtain the best possible correlation between X and Y. Moreover, the PLS solution serves to model the X-block in such a way that the best model is obtained for predicting Y. Hence, a PLS model can be very useful for predicting quality-related parameters, which are usually both expensive and difficult to measure. Instead of having to wait for a certain time to obtain the critical value, it can be immediately predicted with such a model.

Since the method as described above is general and built upon a statistical model instead of a physical model, the question of which or what kind of signals are represented in the model is rather irrelevant. However, the fact that signals are not necessarily correlated to the object does not mean they have no influence. Quite contrary they will be taken care of when the model is built. Nevertheless, the method as described is open for measurement of any value, e.g. acoustic signals, manually input values, oil drops, pressure, ozone release, oil quality, etc.

According to another advantageous embodiment of the present invention, the step of performing a non fault check on said second set of operational data before said steps of uploading and storing, is followed by discarding operational values in excess of predetermined value limits from the operational data subsequently updated to the central database. Furthermore, the step of discarding operational values in excess of predetermined value limits can be followed by collecting discarded values in an additional database for error modelling and/or failure mode modelling.

According to a further advantageous embodiment of the present invention, the connection of the individual machine to the data base can be carried out at prescribed points of time, and data measured for the individual machine may be compared with operational data previously collected for the same machine According to a further advantageous embodiment of the present invention, the operational data of the individual machine can be compared with corresponding data in the data base, that has been contributed by machines of the same type and age. By doing so, it can be decided, whether the particular machine changes more than the other corresponding machines. According to a further advantageous embodiment of the present invention, the changes over time in operational data collected for an individual machine are compared to changes over time of reference data for all similar machines connected to the data base.

According to a further advantageous embodiment of the present invention, the data transmitted to and received from the data base can be compressed.

According to a further advantageous embodiment of the present invention, the age of the data contained in the data base can evaluated, and the data having reached a prescribed age can be compressed accordingly, in order to be used, e.g., for long term studies. In this case compression will also include discarding non-essential elements of the data records, for example, or by a method of reducing the depth of information detail. The confidentiality of the collected data is protected, but each individual machine can be separated in the context of a comparison with the total data.

According to a further advantageous embodiment of the present invention, the machines connected to the data base preferably are electrical machines.

According to a further advantageous embodiment of the present invention, the data base preferably contains load point values taken at different points in time for every machine connected.

According to a further advantageous embodiment of the present invention, the operational data for an individual machine may be compared to previously collected operational data for the same machine.

As regards the ownership of data between the buyer of an object or machine in question and a data bank owner, the local equipment should be simple and cheap so that many objects or machines can be connected to the central data base. Therefore, the ownership rights of the local object owner should extend to those reports that are produced by the system based on the data that the local owner has given the system. The local owner purchases a subscription and pays for reports. The model that is installed locally produces a value, with a certain history, that can be read off, shown in a display instrument or in an automation system related to the individual machine.

The features and advantages of the present invention will become more apparent by reading the following description with respect to the accompanying drawing; in which:

BRIEF DESCRIPTION OF THE DRAWINGS

FIG. 1 schematically illustrates a plurality of operational data that is measured FIG. 2 schematically illustrates a depiction of reference data FIG. 3 schematically illustrates the steps of the method according to an embodiment of the invention.

DESCRIPTION OF THE PREFERRED EMBODIMENTS

FIG. 1 shows a table of operational data measured for an individual machine.

Measurements of operational data, such as that shown in FIG. 1, are taken from a plurality of similar machines in a selected class of machines and stored in a reference database 10, 30. At least one first reference data is formed from the stored operational data at point 12 using one or more suitable analysis techniques and stored in the reference data base 10, 30.

Figure 2:
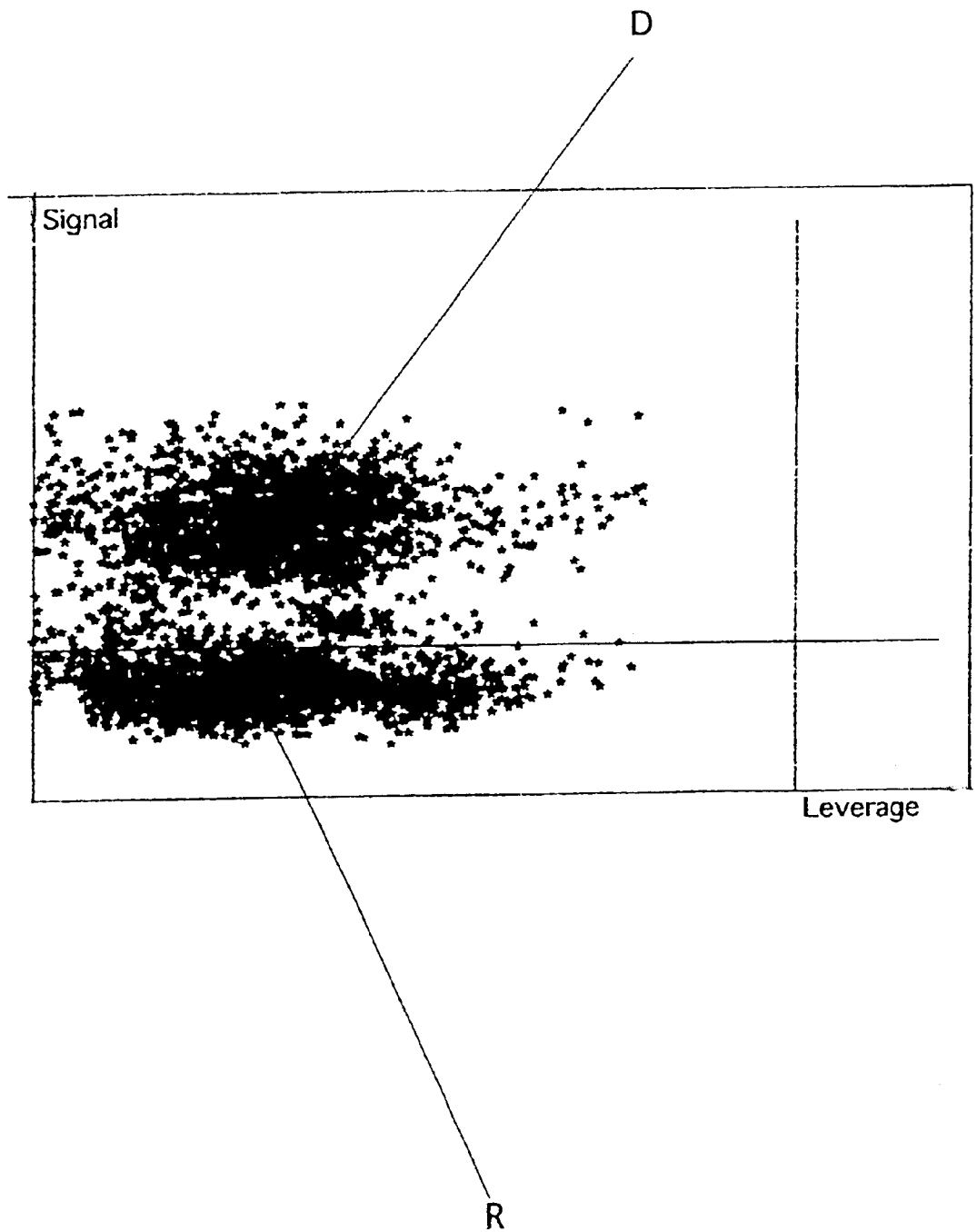

FIG. 2 shows a plot of a first reference data formed from measurements of operational data and a second (simulated) reference data.

The plot takes the form of a swarm of points and demonstrates how a (simulated) weak disturbance in the second reference data D from an individual machine is clearly indicated when plotted together with the first reference data R from a plurality of similar machines.

Figure 3:
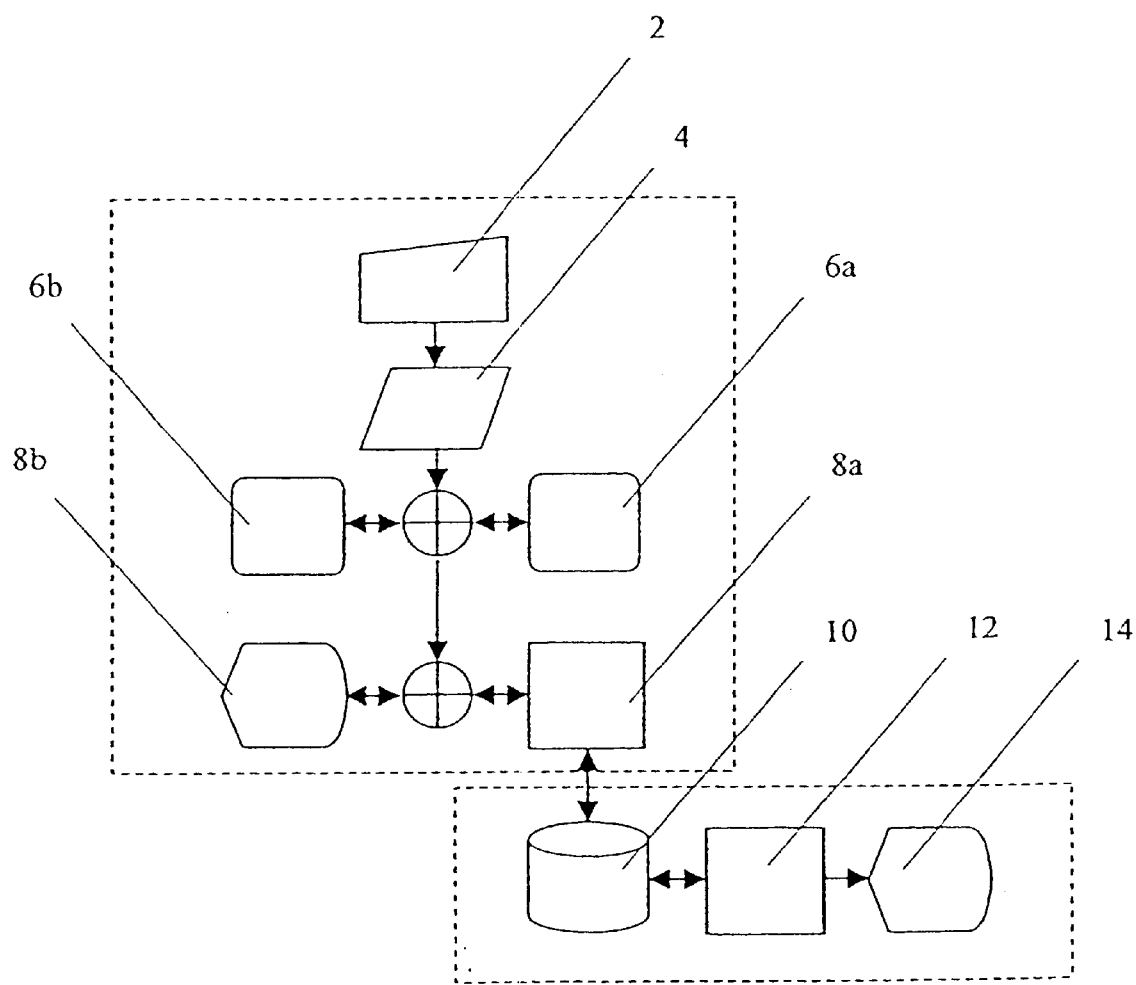

FIG. 3 shows steps of a method for monitoring the status of an individual machine according to an embodiment of the invention. At point 2, the operational data of the individual machine is measured, preferably by means such as a transducer 16 as in FIG. 2. The data measured at point 2 is gathered at point 4 by means of a data acquisition tool 18. The second set of operational data for the individual machine is stored in an individual database of which preferably at least a copy of that individual database is arranged locally at the individual machine. Following the gathering of data at point 4, the acquired data is pre-processed at point 6. The pre-processing can be executed in at least two modes, mode 1 being a model comparison with transducer data for a supervision of the object, and mode 2 being a raw data filtering, intended for data modelling or focusing. At least one second reference data is formed at point 6b from the measured operational data of the individual machine. The second reference data is formed using the same statistical analysis technique on the same operational data, or selection from operational data, as the first reference data. The second reference data is preferably presented as a graphical plot or picture, such as that depicted in FIG. 2. The second reference data so formed is compared locally at a point 6a with an existing first reference data formed in a central data base 10 from measurements from a plurality of similar machines in a selected class of machines, as described above. Alternately, the second reference data may be communicated to the central database 10, 30 and a comparison carried out centrally at point 14 and the comparison or result of the comparison then communicated back to point 8 for display at 8b and/or storage at 8a. In practice there may be more than one statistical analysis employed for a single machine, and more than one selection made from all operational data measured. This means that there may be a series of different first reference data each of which may be compared with a corresponding second reference data.

In an alternate development of the invention, the measured operational data of the machine may be communicated to the central database 30 and processed centrally to form the second reference data. As above, the second reference data is then compared with the existing first reference data formed from the plurality of similar machines in a selected class of machines. The comparison may be carried out either centrally or locally, and the comparison or its result subsequently displayed locally and stored locally. This alternative of central processing and/or central comparison may be preferred when local data processing facilities at the individual machine are limited.

Measurements of operational data of the individual machine taken at point 2 are preferably processed at point 6b before being communicated to the central database 10, 30. At the central database the measurements are added to the data from the plurality of similar machines in a selected class of machines from which the existing second reference data was formed. Subsequently the second reference data is updated to incorporate the latest measured operational data.

Prior to uploading operation values measured for the individual machine to the central database, a non-fault check is performed. Data values in excess of predetermined value limits, as a result for example of an imminent failure or a component failure, are discarded from the operational data that is subsequently updated to the central database. Such data is instead collected in fault analysis databases for formation of failure models, error models and the like.

Such failure model information may be used as an alternative second reference data for use when a first reference data is determined, according to predetermined values, to show a deviation that should be tested against a failure mode or model.

The, pre-processing can alternatively be executed at point 6a for a model comparison with transducer data for a supervision of the object, and at point 6b for a raw data filtering, intended for data modelling or focusing, or both. According to the method, the local results can either be displayed at point 8b, or can be transferred at point 8a to a storage for the individual object for introduction into a central data base 10, or both. At the same time a model based on the data of many objects of the same type in the central data base 10, the first reference data, is transferred back to the individual object and stored for future use at point 6a for a model comparison with transducer data for a supervision of the object. The model or first reference data based on the data gathered in the data base is created at point 12, preferably using a multivariate modelling method. Furthermore, central reports can be created at point 14 for a global analysis of the gathered data. The two frames in FIG. 3, made up of dashed lines, respectively, indicate the steps executed at the individual object on the one hand, and the steps executed centrally, on the other hand in an embodiment of the invention.

In a further embodiment of the invention, the operational data measured at the individual machine may, in addition, be compared with operational data previously collected for the same machine and stored locally or centrally. The collected operational data may be examined and changes in operational data over time analysed and compared with changes over time in the first reference data gathered from the plurality of similar machines.

Figure 4:
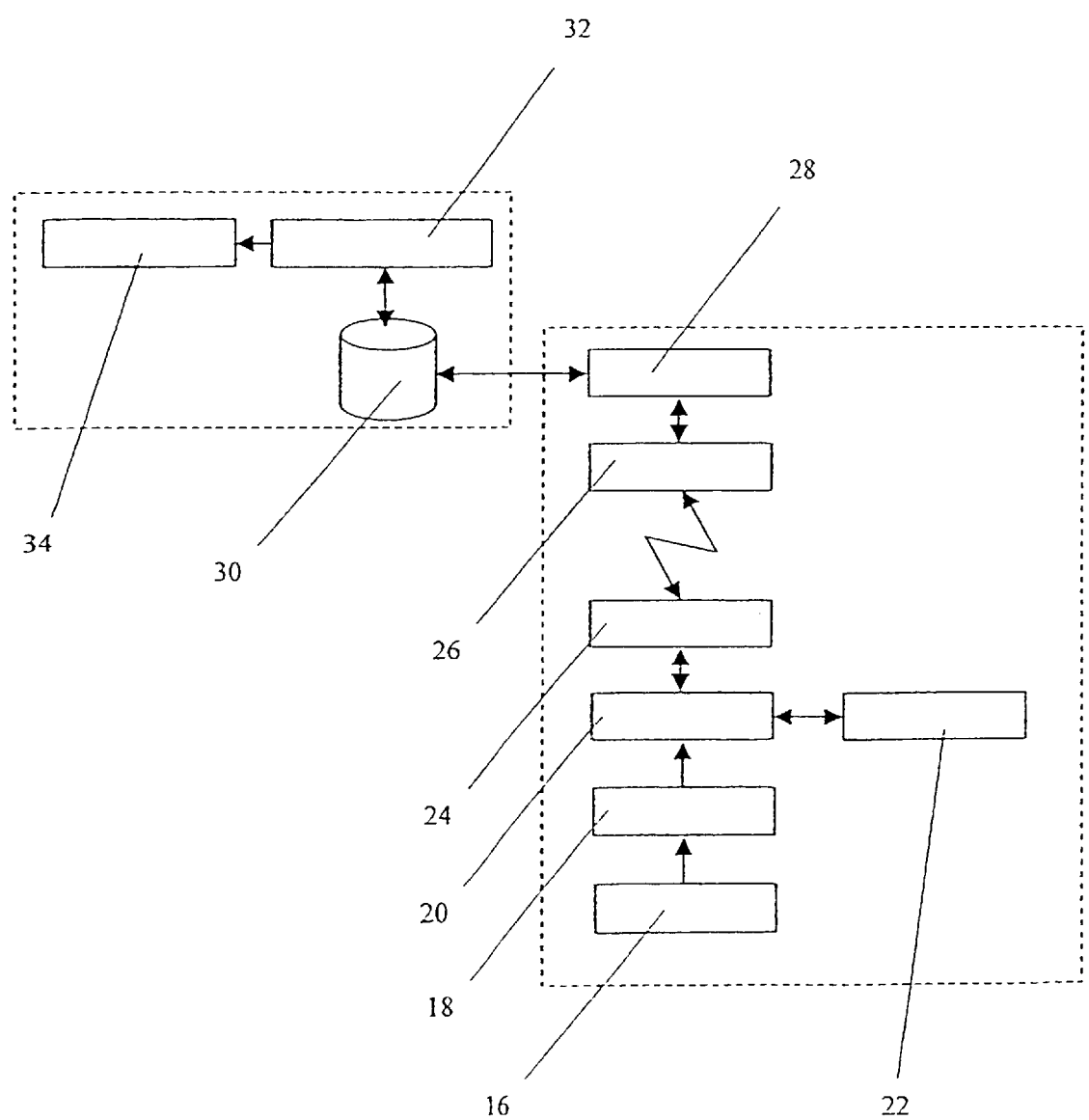
FIG. 4 schematically illustrates an embodiment of a system for executing the method of the present invention.

FIG. 4 illustrates an embodiment of a system for executing the method for the present invention. An individual object, preferably an electrical machine, is provided with a transducer 16, which is connected to a means for data acquisition 18, preferably a computer system, to perform measurements with respect to at least one operational data of the object in question (not shown), e.g. the bearing temperature, the oil quality, etc as shown in FIG. 1. The data acquisition means 18 is connected to a pre-processing unit 20, wherein a pre-processing of the gathered data can be executed in at least two modes, mode 1 being a model comparison using the first reference data together with transducer data for a supervision of the object, and mode 2 being a raw data filtering, intended for data modelling or focusing. The pre-processing unit 20 is connected with a report module 22, for creating reports for the individual object. The first reference data model with which the gathered transducer data will be compared is obtained by means of a send/receive connection between a communications interface 24 on the side of the object in question and a communications interface 26 on the side of a central data base 30, providing storage 28 for the transducer data of the object in question, as well as for other objects of the same or a similar type that are or can be connected to the central data base 30 as well. According to the embodiment as shown in FIG. 3, the data base 30 is connected with an analysis tool, for creating statistical models based upon the data gathered in the data base 30. Preferably the analysis tool is capable of multivariate modelling. The statistical analysis is preferably performed using a software for statistical analysis. A suitable software for performing the Model-building to provide the first reference data is for example Simca-P®. The Simca-P® software was specially developed for multivariate modelling of process data using PCA and PLS. Obviously, an appropriate model can also be executed on-line with the help of the central data base, set up for multivariate presentation. Furthermore, the statistical significance via predictive capacity as well as other advanced statistical diagnostics can be executed off-line with the appropriate software on the site of the individual object.

Using the software for statistical analysis, the modelling can be performed on the complete operational data set in the data base 30, or separate models can be prepared on subsets of the data. Alternatively, several data sets can be merged into one set of data. It is even possible to include external data (e.g. laboratory data) or economical parameters (e.g. running costs) in the analysis.

An individual object although preferably an electrical machine may also be a transformer, a reactor, a current or voltage converter, in fact any electrical device in the field of electrical power generation, transmission and distribution. It is within the scope of the claims that the object may also be any other machine or the whole or any part of an industrial process.

What is claimed is:

1. A method for monitoring the condition of an individual machine belonging to a selected class of machines, wherein operational data significant for that condition is compared with a reference data according to a predetermined criterion, and wherein an output signal indicating the result of the comparison is formed, characterised in that the method comprises the steps of:

creating a first set of operational data for the selected class of machines on the basis of data stored in a reference database, creating a second set of operational data for the individual machine based on measurements performed on the individual machine, said step of creating a second set of operational data including storing said second set of operational data in an individual database located at the reference database, forming a first reference data in dependence on values of at least a selection of said first set of operational data, forming a second reference data in dependence on values of said second set of operational data, comparing said second reference data with said first reference data in accordance with the predetermined criterion, and forming the output signal in dependence on the result of said comparison.

2. A method according to claim 1, characterised in that the method further comprises the step of:

uploading said second set of operational data to said individual database to be stored therein.

3. A method according to claim 2, characterised in that the method further comprises the step of performing a non-fault check on said second set of operational data before said step of uploading said second set of operational data to said individual database.

4. A method according to claim 1, characterised in that said step of forming a first reference data comprises the step of selecting in said reference database operational data for a selected group of parameters and forming said first reference data in dependence on operational data for said selected group of parameters, and that said step of forming a second reference data comprises the step of selecting in said second set of operational data operational data for said selected group of parameters.

5. A method according to claim 4, characterised in that the method further comprises the steps of performing at least one statistical analysis according to a predetermined statistical method of the operational data stored in said reference database (10, 30), and creating the first reference data in dependence on the result of said statistical analysis.

6. A method according to claim 5, characterised in that the reference database (10, 30) contains a time series of values for one or more parameters of the operational data for every individual machine that can be connected to the reference database (10, 30).

7. A method according to claim 6, characterised in that the first reference data as provided by the reference database (10, 30) remains unaffected by the measured operational data of the individual machine, at least until service measures or component exchanges have been carried out.

8. A method according to claim 1, characterised in that the second reference data is formed at a local machine.

9. A method according to claim 1, characterised in that the second reference data is formed centrally in a system including the reference database (10, 30).

10. A method according to claim 8, characterised in that the first reference data is compared with the second reference data at the local machine.

11. A method according to claim 10, characterised in that the first reference data is formed from a copy of the individual database, located at the local machine.

12. A method according to claim 9, characterised in that the first reference data is compared with the second reference data centrally in a system including the reference database (10, 30).

13. A method according to claim 12, characterised in that the second reference data is obtained from the individual database, located at the system, including the reference database (10, 30).

14. A method according to claim 1, characterised in that two or more first reference data are each formed in dependence on the operational data collected from the selected class of machines.

15. A method according to claim 1, characterised in that two or more second reference data are each formed in dependence on the operational data collected from the individual machine.

16. A method according claim 5, characterised in that the statistical method used is a multivariate analysis.

17. A method according claim 16, characterised in that the statistical method used includes multivariate analysis projection techniques.

18. A method according claim 17, characterised in that the multivariate analysis is a Principal Component Analysis (PCA).

19. A method according claim 17, characterised in that the multivariate analysis is a Projection to Latent Structures (PLS).

20. A method according to claim 3, characterised in that the step of performing a non fault check on said second set of operational data before said steps of uploading and storing, is followed by discarding operational values in excess of predetermined value limits from the operational data subsequently updated to the central database.

21. A method according to claim 20, characterised in that the step of discarding operational values in excess of predetermined value limits is followed by collecting discarded values in an additional database for error modeling and failure mode modeling.

22. A method according to claim 2, characterised in that downloading reference data to the individual machine and uploading to the reference database (10, 30) is carried out at predetermined points of time.

23. A method according to claim 1, characterised in that operational data measured for the individual machine is compared with operational data previously collected for the same machine.

24. A method according to claim 1, characterised in that changes over time in the operational data of the individual machine are compared with changes over time in the reference data formed from a plurality of similar machines.

25. A method according to claim 1, characterised in that the age of the data contained in the reference database (10, 30) is evaluated, and the data having reached a prescribed age is compressed accordingly by reducing the depth of information detail.

26. A method for monitoring the condition of an individual machine belonging to a selected class of machines, wherein operational data significant for that condition is compared with a reference data according to a predetermined criterion, and wherein an output signal indicating the result of the comparison is formed, characterised in that the method comprises the steps of:

creating a first set of operational data for the selected class of machines on the basis of data stored in a reference database, creating a second set of operational data for the individual machine based on measurements performed on the individual machine, performing a non-fault check on said second set of operational data, uploading and storing said second set of operational data in said reference database after performing said non-fault check, discarding operational values in excess of predetermined value limits from the operational data subsequently updated to the central database, forming a first reference data in dependence on values of at least a selection of said first set of operational data, forming a second reference data in dependence on values of said second set of operational data, comparing said second reference data with said first reference data in accordance with the predetermined criterion, and forming the output signal in dependence on the result of said comparison.

27. A method according to claim 26, characterised in that the step of discarding operational values in excess of predetermined value limits is followed by collecting discarded values in an additional database for error modeling and failure mode modeling.

* * * * *

UNITED STATES PATENT AND TRADEMARK OFFICE
CERTIFICATE OF CORRECTION

| | |
|---|---|
| PATENT NO. | : 6,694,286 B2 |
| APPLICATION NO. | : 09/751153 |
| DATED | : February 17, 2004 |
| INVENTOR(S) | : Torbjorn Ottosson |

It is certified that error appears in the above-identified patent and that said Letters Patent is hereby corrected as shown below:

<u>Title page,</u>
Item [30], Foreign Application Priority Data, delete
"Dec. 23, 19999 EP………..99125818".

<u>Column 2,</u>
Line 11, replace "up-dated" with -- updated --.
Line 51, replace "resuiting" with -- resulting --.

<u>Column 3,</u>
Line 59, replace "up-loading" with -- uploading --.

Signed and Sealed this

Twenty-seventh Day of June, 2006

JON W. DUDAS
*Director of the United States Patent and Trademark Office*